(12) United States Patent
Beele (10) Patent No.: US 7,802,798 B2
(45) Date of Patent: Sep. 28, 2010

(54) SYSTEM FOR SEALING A SPACE BETWEEN A TUBULAR OPENING AND A TUBE

(75) Inventor: Johannes Alfred Beele, Aalten (NL)

(73) Assignee: Beele Engineering B.V., Aalten (NL)

( * ) Notice: Subject to any disclaimer, the term of this patent is extended or adjusted under 35 U.S.C. 154(b) by 0 days.

(21) Appl. No.: 10/548,130

(22) PCT Filed: Jun. 14, 2004

(86) PCT No.: PCT/NL2004/000418

§ 371 (c)(1),
(2), (4) Date: Jan. 8, 2007

(87) PCT Pub. No.: WO2004/111513

PCT Pub. Date: Dec. 23, 2004

(65) Prior Publication Data

US 2007/0273107 A1    Nov. 29, 2007

(30) Foreign Application Priority Data

Jun. 18, 2003  (NL) .................................... 1023688

(51) Int. Cl.
*F16L 5/10* (2006.01)
*F16L 21/02* (2006.01)

(52) U.S. Cl. ........................ 277/607; 277/615; 277/648; 277/649

(58) Field of Classification Search ................. 277/607, 277/615, 648, 649; 138/89
See application file for complete search history.

(56) References Cited

U.S. PATENT DOCUMENTS

| | | | | |
|---|---|---|---|---|
| 2,032,492 A | * | 3/1936 | Nathan | 277/615 |
| 2,896,974 A | * | 7/1959 | Bush | 277/607 |
| 3,016,722 A | * | 1/1962 | Batdorf | 464/162 |
| 3,352,212 A | * | 11/1967 | Read | 277/436 |

(Continued)

FOREIGN PATENT DOCUMENTS

DE    20103786    *  8/2001

(Continued)

OTHER PUBLICATIONS

PCT International Search Report from International Application No. PCT/NL2004/000418 dated Oct. 29, 2004.

*Primary Examiner*—Alison K Pickard
(74) *Attorney, Agent, or Firm*—Wolf, Greenfield & Sacks, P.C.

(57) ABSTRACT

A system for sealing a space (16) between an inner wall (6) of a tubular opening (7) and at least one tube (17) or duct at least partly received in the opening (7), wherein the system comprises at least two segmental longitudinal parts (1) for forming a sealing plug (5) which can be received in the said space (16), wherein the longitudinal parts (1) are each provided with an outside (2) provided with a number of outer ribs (3) for realizing, in use, contact surfaces (4) closed upon themselves between the sealing plug (5) and the inner wall (6) of the opening (7), and wherein, further, each of the longitudinal parts (1) is provided with an outer collar (9) intended to be placed against an outer edge of the opening (7) in use, and wherein, further, the outer ribs (3) each substantially have the shape of a sawtooth (11) with rising surface (12).

31 Claims, 7 Drawing Sheets

U.S. PATENT DOCUMENTS 3,578,027 A * 5/1971 Zopfi .......................... 138/89
3,702,193 A 11/1972 Flegel et al.
4,293,138 A * 10/1981 Swantee ..................... 277/607
4,664,421 A * 5/1987 Jones ......................... 277/615
7,410,174 B2 * 8/2008 Jones et al. ................. 277/615

FOREIGN PATENT DOCUMENTS

EP 0 139 337 A3 5/1985

* cited by examiner

SYSTEM FOR SEALING A SPACE BETWEEN A TUBULAR OPENING AND A TUBE

The invention relates to a system for sealing a space between an inner wall of a tubular opening and at least one tube or duct at least partly received in the opening, whose axis is substantially to the axis of the opening, while the system comprises at least two segmental longitudinal parts for forming a sealing plug which can be received in this space, while the longitudinal parts are each provided with an outside provided with a number of outer ribs spaced apart in a longitudinal direction for realizing, in use, contact surfaces closed upon themselves in the circumferential direction between the sealing plug and the inner wall of the opening, and while, further, each of the longitudinal parts is, at a first front end, provided with an outer collar intended to be placed against an outer edge of the opening in use, and while, further, at least one of the outer ribs substantially has the shape of a sawtooth with a rising surface rising towards the first front end.

A tubular opening as referred to hereinabove may comprise a tubular passage in a floor, deck, wall or partition. Another possibility is a tube in which another tube is at least partly received. The longitudinal parts are also referred to as shell parts. Substantially parallel is, in any case, also understood to mean a situation in which the axis of the opening and the axis of the tube or duct received in the opening include an angle of five degrees.

Such a system is used for, for instance, two tubes connected with each other through which a fluid can flow. One of the tubes may, for instance, form a house service connection and have a smaller diameter than the tube which forms the main line or is a branch thereof. Such tubes may be used for, for instance, transport of water, gas, oils, liquid chemicals, etc. A space located between the tubes can then be sealed with a system as described hereinabove. It is also possible that cables for, for instance, telephone, electricity and television are fed through such tubes connected with one another. Another possibility is using the system as a sealing between glass fiber cables and protective tubes. Such a system may also be used with walls of buildings, in particular foundation walls and floors but also roofs where, by means of lost plastic tube parts, passages are left open in the poured concrete through which the through ducts, such as tubes for water or gas, or cables can be fed. Of course, a passage may also be provided in a concrete plate with the aid of a boring method. The space between the duct and the inner wall of the lost tube part or the borehole may later be sealed with such a system.

Further, such a system can be used in the construction of new buildings and maintenance of ships and offshore installations. Sections in such constructions are usually formed by placing prefabricated partitions according to a predetermined plan in the dock of the wharf. Even before the partitions are placed, feed-through tubes can be provided in the partitions, for instance with the aid of a welding method. After the duct is fed through a feed-through tube, the system described in the introduction can be provided for sealing the space between the inner wall of the feed-through tube and the fed-through duct. The sealing plug thus formed then absorbs the possible movement by deformation of the partition during, for instance, a fire or an explosion. The sealing plug further has a vibration-absorbing function so that fatigue symptoms are avoided. The sealing plug is further sound-insulating. In addition, a thermal insulation may be obtained, especially when air is locked in a feed-through tube between two of such plugs. It is further possible that the feed-through tube and the duct, cable or tube fed through it are manufactured from different metal-comprising materials. This is because there will be no contact between the feed-through tube and the duct, cable or tube fed through it so that galvanic corrosion is at least virtually precluded.

A system as described in the introduction is known from NL 7809260. The outer ribs of the longitudinal parts of this known system also have the shape of a sawtooth. The diameter of the tubular opening in which the system is placed as the sealing assembled from the longitudinal parts needs to be somewhat smaller than the diameter of the sealing in a transverse plane in which one of the sawtooth-shaped outer ribs is located. With a much smaller diameter of the tubular opening, the longitudinal parts can hardly, if at all, be placed in the opening, since the pressure exerted by the tops on the inner wall of the opening hampers movement along the inner wall. With a much larger diameter of the opening, the longitudinal parts can be placed relatively easily in the opening, but the sealing will function less adequately when a relatively small force is exerted in the longitudinal direction. In other words, the tolerance of the dimensions of the opening for which such a known system is suitable is relatively small.

It is an object of the invention to meet this problem.

This object is achieved with a system according to the invention which is characterized in that a part of the rising surface adjoining the top of the sawtooth is, with respect to a part of the rising surface located farther from the top, provided with a leveling which includes an angle with the longitudinal direction. It has surprisingly been found that the tolerances in the diameter of an opening for which a system according to the invention is suitable can be in a wider range than in the known system. It has further been found that, per outer rib, a much larger contact surface closed upon itself in a circumferential direction, located between the sealing and the inner wall of the opening, can be formed. As a result, the system according to the invention can resist much higher pressures in use than the known system. This further offers the possibility to reduce the number of outer ribs, which also allows the shortening of each of the longitudinal parts. Use of the system in an opening which is shorter in axial direction than the minimum length of an opening in which the system known from the prior art used to be applicable may therefore also be counted among the advantages. It also appears that the deformation of the sawtooth upon pressing the leveling against the inner wall of the opening is smaller than when using a sawtooth without leveling. A smaller deformation results in a longer tool life compared to a system of which the saw teeth have a greater deformation.

Preferably, a meeting of the leveling and the part of the rising surface located farther from the top forms an outwardly directed bend located in the rising surface. In use, it is found that this allows the leveling to more easily move to the inner wall of the opening in which the system has been received.

It is further possible that the sawtooth is provided with a falling surface with a part located relatively far from the top and a part adjoining the top, while a meeting of the part of the falling surface adjoining the top and the part of the falling surface located relatively far from the top forms an inwardly directed bend in the falling surface. This bend allows a relatively simple deformation of a part of the outer rib located above the bend, which facilitates placing the system into the opening and facilitates the forming of a large contact surface between the inner wall of the opening and the outer ribs.

Further, this contributes to great tolerance in the acceptable diameter of the opening in which the system according to the invention can be used. In addition, the bend contributes to the fact that a part of the outer rib located below the bend deforms relatively difficulty, which is favorable to the stiffness of the longitudinal parts.

Preferably, the part of the falling surface located relatively far from the top is designed so as to be inclined towards the front end. In use, this provides the outer rib with support when, upon being placed in the opening, the outer rib is compressed and somewhat bent in the direction of the first front end by contact with the inner wall of the opening. This support offers resistance to drastic deformation of the rib. This contributes to the fact that a relatively large contact surface is formed between the outer ribs and the inner wall of the opening, and thus a good sealing is formed.

Preferably, further, the bend located in the rising surface is located farther from the outside than the bend located in the falling surface. This makes deformation of the part of the leveling located near the top easier than deformation of a part of the leveling located farther from the top. This contributes to being able to simply place the system into the opening and to obtaining a good sealing.

Although it is possible that the longitudinal parts are each provided with an inside having a flat design, in a preferred embodiment, the longitudinal parts are each provided with an inside provided with a number of inner ribs spaced apart in a longitudinal direction for realizing, in use, annular contact surfaces between the sealing plug and the at least one tube or duct.

Here, preferably, at least one of the inner ribs has the shape of a trapezium, while, further, an abutting surface of the trapezium farthest away from the inside is smaller than any other surface of the trapezium parallel to the abutting surface. Such an inner rib has a great resistance to bending of the inner rib, which is also favorable to the stiffness of the system. In addition, this contributes to the possibility that the at least one tube or duct can slide through the formed sealing plug. This is because the total contact surface between the formed sealing and the at least one tube or duct is much smaller than the total contact surface between the sealing plug and the inner wall of the opening. Further, in use, in view of the small contact surface between the sealing plug and the at least one tube or duct compared to the known system, the formed sealing plug can relatively easily slide along or over the at least one tube. This facilitates the placing of the system.

It is possible that the angles adjoining the abutting surface are blunted or rounded. This makes the placing of the system around the at least one tube or duct still easier.

In a special embodiment, each top is located in a transverse plane of a first type and each inner rib is free from overlap with one of the transverse planes of the first type. This entails that the pressure distribution in the sealing plug is more uniform than in the known systems where the inner rib intersects a transverse plane in which the top of the outer rib is located. In addition, the placing of the system in the opening has become easier since no serious thickening occurs anymore when both the outer rib and the inner rib deform. This is because a possible deformation of the inner rib will be somewhat offset in the longitudinal direction with respect to a possible thickening of the outer rib. In one transverse plane, virtually no deformation will occur resulting from both deformation of the inner rib and deformation of the outer rib.

Further, here, a part of the rising surface located near a base of the sawtooth may be located in a transverse plane of the second type and that each inner rib has overlap with one of the transverse planes of the second type. In use, this also contributes to preventing point loads. Here, also, a favorable pressure distribution likewise offers advantages for placing the system.

Further, optionally, each of the longitudinal parts is provided with a run-in outer rib located near a second front end remote from the first front end, which run-in rib extends up to a same outer circumferential level as the level up to which each outer ribs extends, while, with respect to the centerline of the sealing formed in use, the outer circumferential level is the level up to which each outer rib extends. Such a run-in rib particularly makes orienting each longitudinal edge or the longitudinal edges formed as a sealing relatively simple.

In particular, each of the longitudinal parts may be provided with a first inner collar located on the inside of the first front end, which collar extends up to a same inner circumferential level as the level up to which each inner rib extends, while, with respect to the centerline of the sealing formed in use, the inner circumferential level is the level up to which each inner rib extends. In use, this prevents a fluid near the first front end from finding a way between the sealing and the at least one tube or duct.

Further, in particular, each of the longitudinal parts may be provided with a second inner collar located on the inside of the second front end, which collar extends up to a same inner circumferential level as the level up to which each inner rib extends, while, with respect to the centerline of the sealing formed in use, the inner circumferential level is the level up to which each inner rib extends. In use, this prevents a fluid near the second front end from finding a way between the sealing and the at least one tube or duct.

Preferably, at least two longitudinal parts are substantially identical. This entails that the manufacture of the individual longitudinal parts can take place according to a same production process.

The system will comprise at least two longitudinal parts. However, it is also possible for the system to comprise three, four, five, six or even more longitudinal parts. This may simplify the placing of the longitudinal parts, particularly with a plurality of tubes or ducts at least partly received in the opening. For a special embodiment of such a system, each of the longitudinal parts comprises at least two inner surfaces, while each of these inner surfaces is provided with a recess extending in the longitudinal direction for being able to at least partly enclose a tube or duct. This offers the advantage that the system is applicable with openings in which three, four, five, six or even more tubes or ducts are at least partly received.

The invention further relates to a wall provided with a tubular opening and at least one tube or duct at least partly received in the opening, whose axis is substantially parallel to the axis of the opening, while a space between an inner wall of the opening and the at least one tube or duct is sealed with the aid of such a system.

In addition, the invention relates to a tube provided with a tubular opening and at least one tube or duct at least partly received in the opening, whose axis is substantially parallel to the axis of the opening, while a space between an inner wall of the opening and the at least one tube or duct is sealed with the aid of such a system.

The invention will now be elucidated with reference to a drawing, in which.

Same parts in the drawing are designated by same reference symbols.

Figure 1:
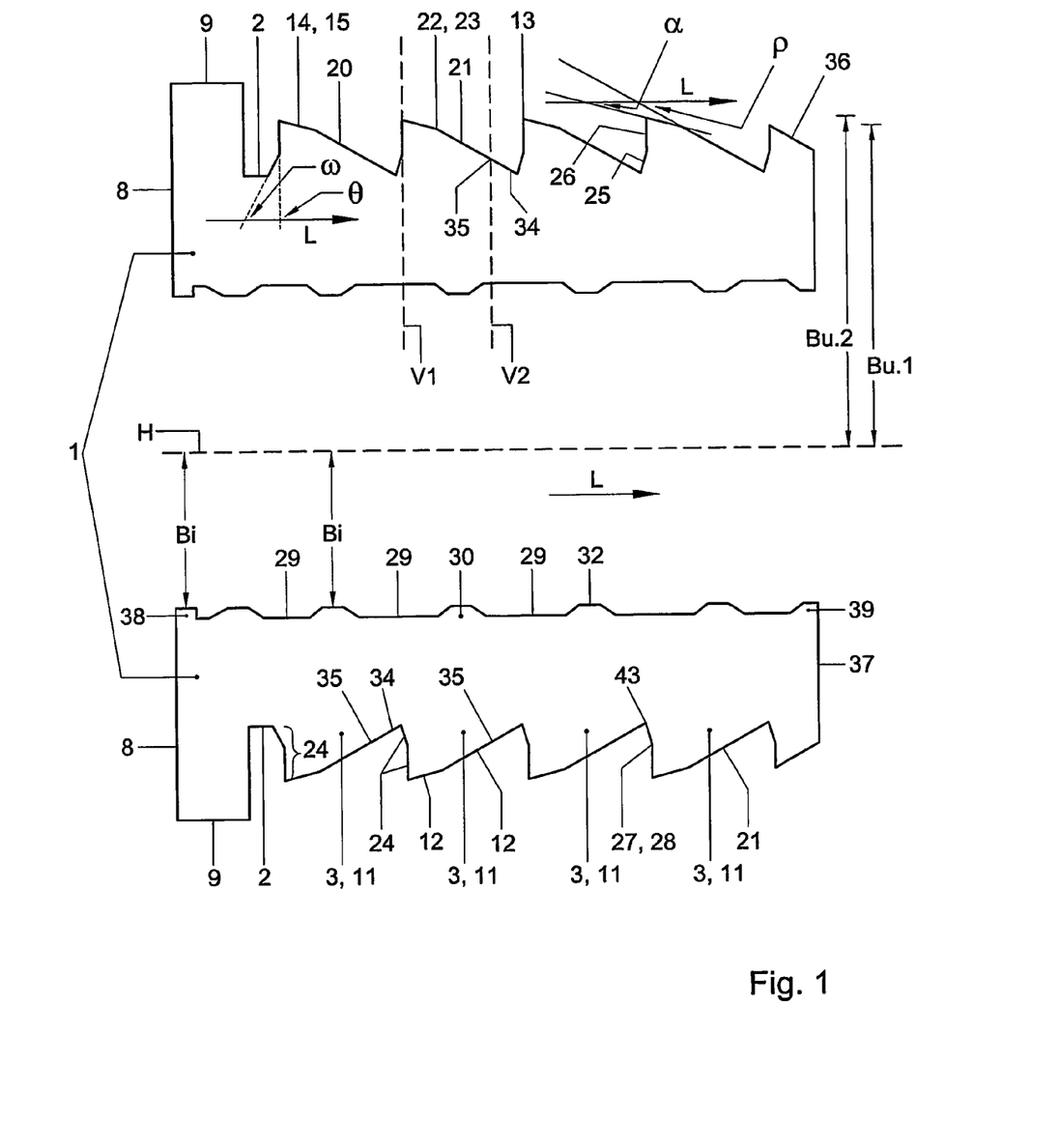
FIG. 1 shows a cross section of a longitudinal part of a system according to a first embodiment according to the invention.

An example of a longitudinal part 1 of a system according to the invention is diagrammatically shown in cross section in FIG. 1. In this example, the system of which the longitudinal part shown is a part comprises two longitudinal parts 1, one of which is shown. An application of this system is shown in a perspective view in FIG. 3. The longitudinal part 1 is provided with an outside 2 provided with a number of outer ribs 3 spaced apart in a longitudinal direction for realizing, in use, contact surfaces 4 closed upon themselves in a circumferential direction (see FIG. 2a) between a sealing plug 5 formed with the aid of the longitudinal parts and an inner wall 6 of a tubular opening 7 (see FIGS. 2a and 2b). At a first frond end 8, the longitudinal part 1 is provided with an outer collar 9 intended to be placed against an outer edge 10 of the opening 7 in use (See FIGS. 2a and 2b). The outer ribs 3 each substantially have the shape of a sawtooth 11 with a rising surface 12 rising towards the first front end 8. It is of course possible that only one outer rib has the shape of a sawtooth, or that some but not all outer ribs have the shape of a sawtooth. In this example, all outer ribs have the shape of a sawtooth. A part 14 of the rising surface 12 adjoining the top 13 of the sawtooth 11, is, with respect to a part 20 of the rising surface 12 located farther from the top 13, provided with a leveling 15 which includes an angle with the longitudinal direction L. Each rising surface 12 is provided with a pressing surface 15 adjoining a top 13 of the sawtooth 11. The pressing surface 15 includes an angle α with the longitudinal direction L, which angle α is smaller than an angle β included by a part 21 of the rising surface 12 located farther from the top 13 and the longitudinal direction L. The angle α is in any case larger than zero.

The system according to the invention comprises two or more of such segmental longitudinal parts 1 for sealing a space 16 between the inner wall 6 of the tubular opening 7 and a tube 17 or duct at least partly received in the opening 7, whose axis is substantially parallel to the axis of the opening 7. With the system, a sealing plug 5 can be formed and be placed in the space 16. The sealing plug 5 may also tightly enclose a tube 17 or duct (see FIGS. 2a, 2b, 3 and 4).

A meeting 22 of the leveling 15 and the part 21 of the rising surface 12 located farther from the top 13 forms an outwardly directed bend 23 located in the rising surface 12. Although, in this example, the bend is formed by a meeting of straight surfaces, it is also possible that the bend is formed by a meeting of surfaces which merge more gradually with regard to the orientation of the surfaces.

A falling surface 24 of the sawtooth 11 is provided with a part 25 located relatively far from the top 13, which is designed so as to be inclined towards the first front end 8, with respect to a part 26 of the falling surface 24 adjoining the top 13. The part 26 of the falling surface 24 adjoining the top 13 of the sawtooth 11 includes an angle θ with the longitudinal direction L which is larger than the angle ω included by the part 25 of the falling surface 24 located farther from the top 13 and the longitudinal direction L.

A meeting 27 of the part 26 of the falling surface 24 adjoining the top 13 of the sawtooth 11 and the part 25 of the falling surface 24 located farther from the top forms an inwardly directed bend 28 located in the falling surface 24. The bend 23 located in the rising surface 12 is located farther from the outside 2 than the bend 28 located in the falling surface 24. The note made hereinabove for bend 23 also holds true for bend 28 and a more gradual merge from the part of the falling surface adjoining the top into the part of the falling surface located farther from the top is therefore also understood to mean a bend in this specification. It is further noted that it is also possible to provide a sawtooth with a bend 28 in the falling surface without the rising surface of the sawtooth comprising a leveling. For each feature of the falling surface, it generally holds true that the feature may also be designed with a sawtooth lacking one of some of the features of the rising surface described in this specification.

The longitudinal part 1 is further provided with an inside 29. The inside 29 may have a substantially flat design. Preferably, however, the inside 29 is provided with a number of inner ribs 30 spaced apart in the longitudinal direction L for realizing, in use, annular contact surfaces 31 between the sealing plug 5 and the tube 17. The inner ribs 30 preferably have the shape of a trapezium. An abutting surface 32 of the trapezium farthest away from the inside 29 is smaller than any other surface of the trapezium located parallel to the abutting surface 32.

The angles 33 adjoining the abutting surface 32 are preferably blunted or rounded. These measures, relating to the inside 29 and the inner ribs 30, are also possible in a system whose outer ribs 3 do not have the shape of a sawtooth. There neither needs to be a leveling 15.

Each top 13 is located in an imaginary transverse plane of a first type V1. Each inner rib 30 is preferably completely free from overlap with one of the transverse planes of the first type V1. A part 35 of the rising surface 12 located near a base 34 of the sawtooth 11 is located in a transverse plane of a second type V2. Preferably, each inner rib 30 has overlap with one of the transverse planes of the second type V2. These measures, relating to the positions of the inner ribs 30 with respect to the top 13 of the outer ribs 3, are also possible in a system with longitudinal parts 1 whose outer ribs 3 do not have the shape of a sawtooth. There neither needs to be a leveling 15. Further, the inner ribs 30 may have a different design than described hereinabove.

The longitudinal part 1 shown in cross section is provided with a run-in outer rib 36 located near a second front end 37 remote from the first front end 8. The run-in rib 36 extends up to a first outer circumferential level Bu.1 located closer to a centerline H than a second outer circumferential level Bu.2 up to which each outer rib 3 extends. Here, the first and the second outer circumferential levels Bu.1, Bu.2 are each set with respect to the centerline H of the sealing plug 5 formed in use.

The longitudinal part 1 shown in cross section in FIG. 1 is further provided with a first inner collar 38 located on an inside 2 of the first front end 8, which collar extends up to a same inner circumferential level Bi as the level up to which each inner rib 30 extends. Here, the inner circumferential level Bi is set with respect to the centerline H of the sealing plug 5 formed in use.

The longitudinal part 1 shown in cross section as an example is further provided with a second inner collar 39 located on the inside of the second front end 37, which collar extends up to a same inner circumferential level Bi as the level up to which each inner rib 30 extends. Here, the inner circumferential level Bi is set with respect to the centerline H of the sealing plug 5 formed in use.

Figure 2A:
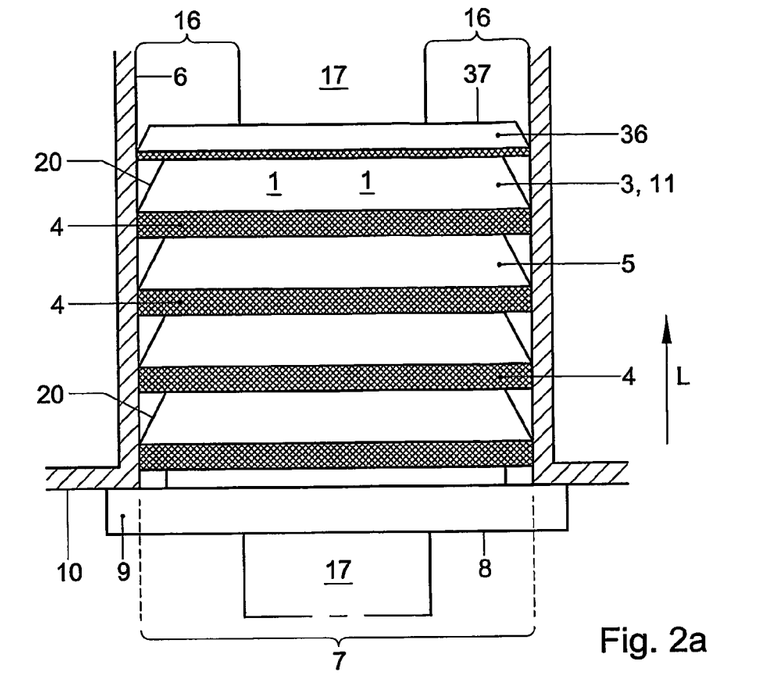
FIG. 2a shows a first partial cross section.
Figure 2B:
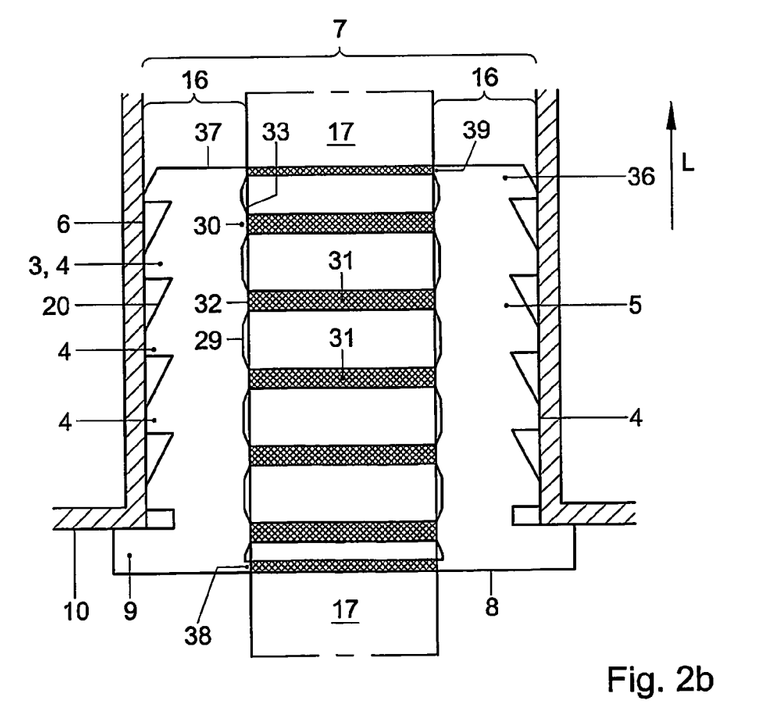
FIG. 2b shows a second partial cross section of a longitudinal part according to FIG. 1 received in a space between an inner wall of a tubular opening and at least one tube or duct at least partly received in the opening, whose axis is substantially parallel to the axis of the opening.

FIGS. 2a and 2b show in more detail how the longitudinal parts 1 cooperate with the inner wall 6 of the opening 7 and the tube 17 at least partly received in the opening. FIG. 2a shows the inner wall of the tubular opening 7 in cross section, while the sealing plug 5 formed with the aid of the longitudinal parts 1 is shown in a view such as it would be seen when one half of the tubular opening 7 would have been removed. In general, outside the tubular opening 7, the longitudinal parts are tightly applied around the tube 17 and then, by a movement in the longitudinal direction L, slid into the space 16 between the inner wall 6 of the tubular opening 7 and the tube 17. The run-in rib 36 will then be the first to contact the inner wall 6 of the tubular opening 7. Upon pressing farther in the longitudinal direction L, more inner ribs 3 will contact the inner wall 6 of the tubular opening 7. Particularly the top 13 and at least a part of the surface of the leveling 15 will contact the inner wall 6. In order to overcome frictional forces occurring during this, it may be necessary to move the sealing plug 5 farther in the direction of the longitudinal direction L into the tubular opening 7 with for instance, a hammer. In addition, all this can be facilitated by providing the longitudinal parts and/or the inner wall of the tubular opening and/or tube 17 with a lubricant such as for instance Vaseline or soft soap. Particularly when the inner wall is manufactured from concrete, this provides a solution. The sealing plug 5 can no longer be moved farther in the longitudinal direction L when the outer collar 9 is placed against the outer edge 10 of the opening 7. This is because the dimensions of the outer collar hinder a further movement in the longitudinal direction L. At least a part of the surface of each leveling 15 will, in that case, be pressed against the inner wall 6 of the tubular opening 7.

FIG. 2b also shows the inner wall 6 of the tubular opening 7 in cross section. The sealing plug 5 received in the tubular opening 7 is also shown in a same cross-sectional plane. Only of the tube 17 at least partly received in the tubular opening, a view is shown in which the annular contact surfaces 31 formed with the aid of the inner ribs 30 of the sealing plug 5 assembled from the longitudinal parts 1 are shown as well. It will be clear that any attempt to move the sealing plug 5 received in the tubular opening 7 in a direction opposite to the longitudinal direction L will be counteracted by the friction at the annular contact surfaces 31 between the inner ribs 30 and the tube 17 and the friction occurring at the contact surfaces 4 closed upon themselves between at least a part of each leveling 15 and an inner wall 6 of a tubular opening 7. The frictional forces to overcome will be greatest at the location of the top 13. Due to the leveling 15, upon a compression of the sawtooth in the direction opposite to the longitudinal direction L, the surface area of the contact surface 4 will increase which entails that a still greater force is needed to press the plug out of the tubular opening 7 in the direction opposite to the longitudinal direction L. It has been found that, in some cases, a sealing plug 5 assembled from the system according to the invention holds out up to at least a pressure of 7 bar exerted on the second front end 37.

Figure 3:
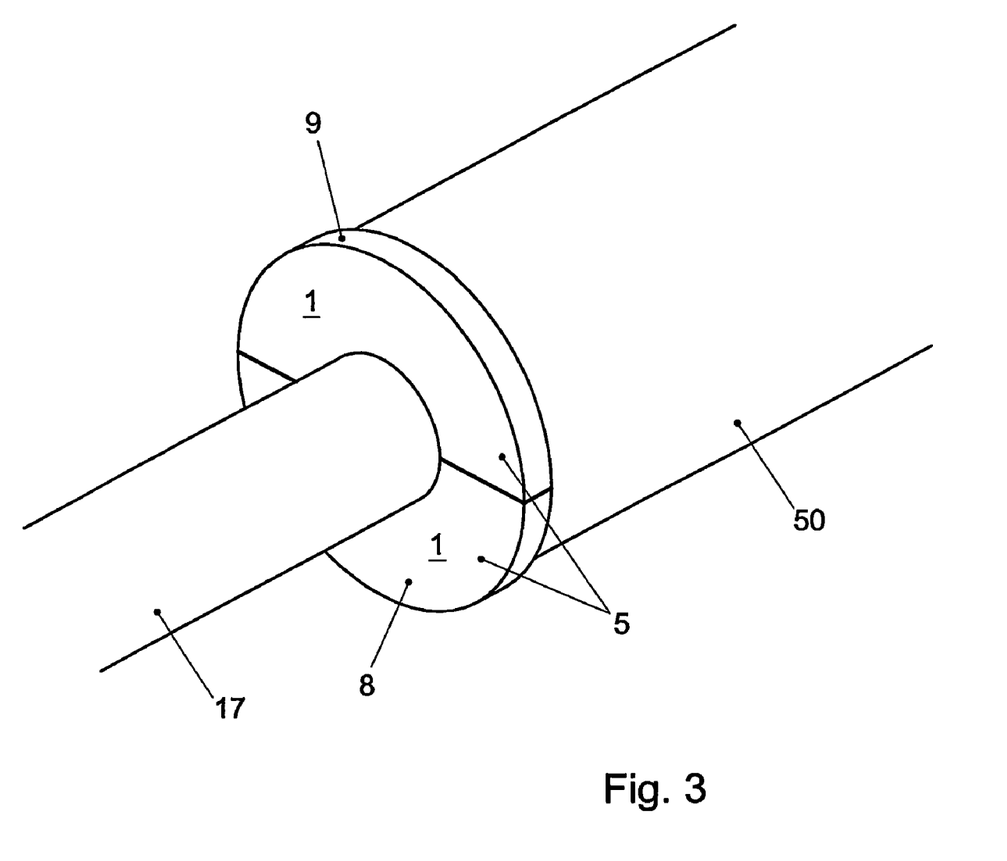
FIG. 3 shows a perspective view of an application of a system according to the invention.
Figure 4A:
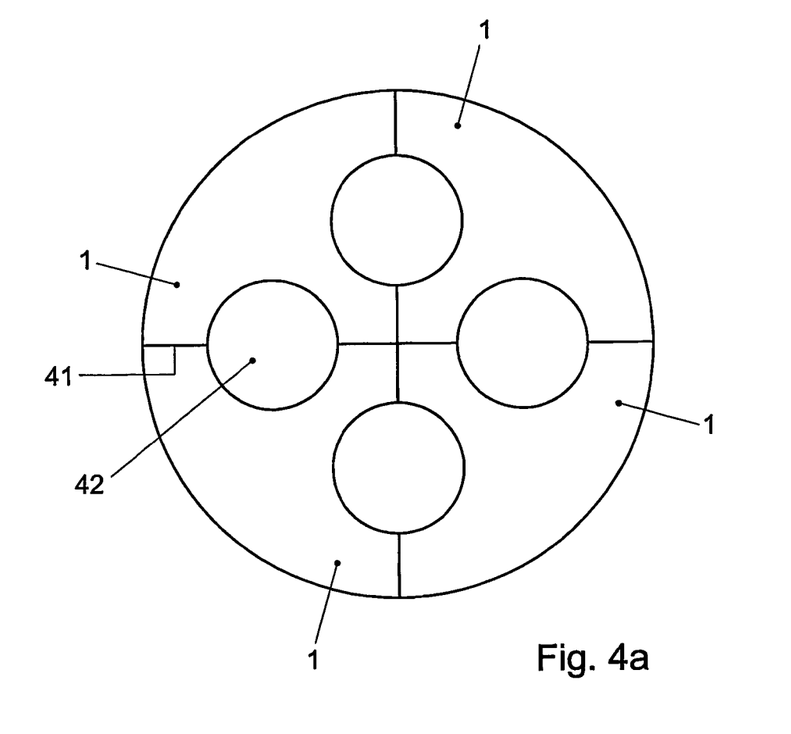
FIG. 4a shows a view in longitudinal direction L of a second embodiment of a system according to the invention.
Figure 4B:
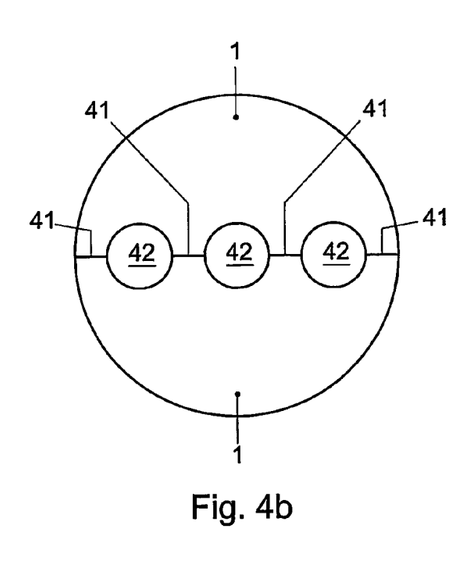
FIGS. 4b-4e show a view in longitudinal direction L of a third, fourth, fifth and second embodiment of a system according to the invention, respectively.
Figure 4C:
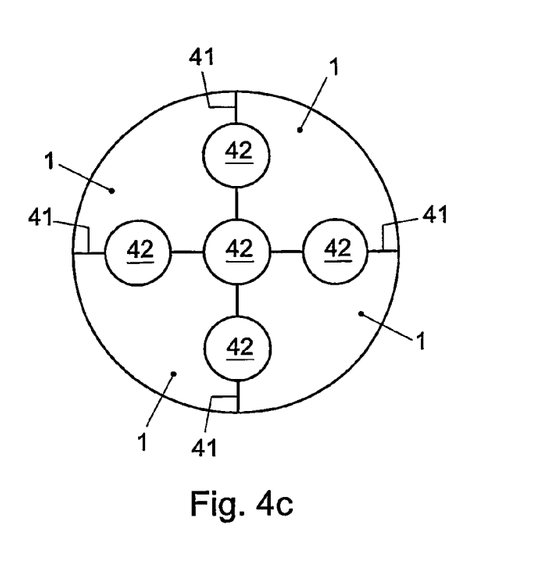
Figure 4D:
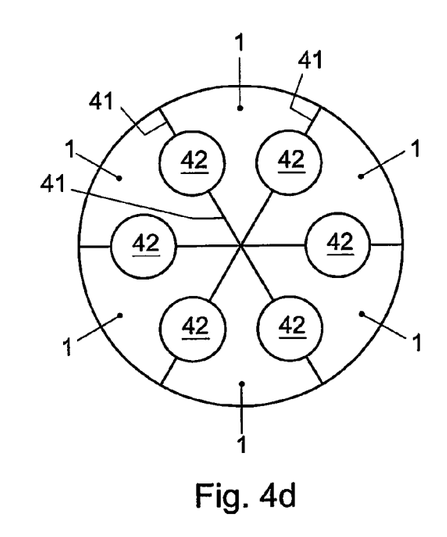
Figure 4E:
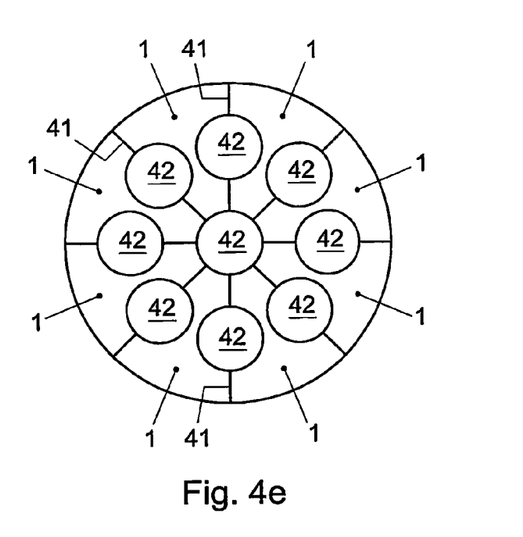

FIG. 3 shows a perspective view of an application of the system according to the invention. Here, a sealing plug 5 assembled from the longitudinal parts 1 has been received in a space between an inner wall of a tubular opening and a tube 17 at least partly received in the opening. The axis of the tube 17 is substantially parallel to the axis of the opening. The opening is not visible because an outer collar located at the first front end of the sealing plug 5 abuts the outer edge of the opening. Of the tubular opening, only an outer wall 50 is shown. In this case, the tubular opening is a part of a tube of which the outer wall 50 is shown. However, it is also possible that the tubular opening is formed in a wall.

It is possible that the system according to the invention comprises three, four, five, six or even more longitudinal parts. Of a system comprising four longitudinal parts, FIG. 4 shows a view of the first front end 8 of the longitudinal parts 1 assembled into a sealing plug. Each of the longitudinal parts 1 comprises at least two inner surfaces 41, while each of these inner surfaces 41 is provided with a recess 42 extending in the longitudinal direction L for being able to at least partly enclose one of the tubes 17 received in the opening 7. FIGS. 4b-4e show the systems according to the invention with three, five, six and nine longitudinal parts, respectively.

The longitudinal parts 1 of the system according to the invention are preferably substantially identical to one another.

Figure 5:
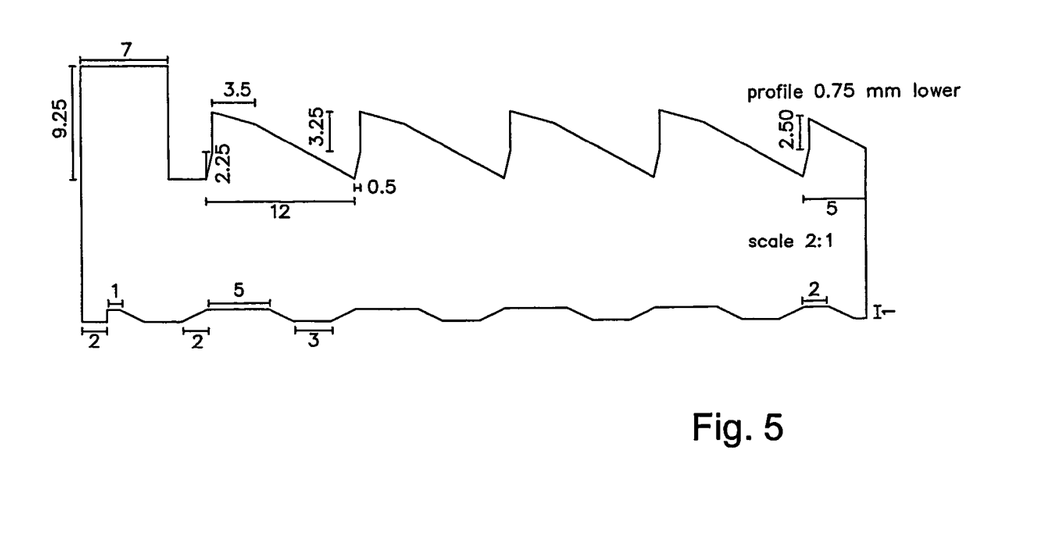
FIG. 5 shows a part of the cross section according to FIG. 1 with preferred dimensions.

FIG. 5 shows a cross section according to a part of FIG. 1 with preferred dimensions.

Longitudinal parts 1 will usually be manufactured from at least somewhat compressible material, such as for instance rubber, preferably rubber with a shore A hardness of 70°. The rubber is preferably of a fire-resistant quality. The rubber may be designed such that it expands upon exposure to elevated temperatures. It is also possible to use a silicone rubber. An electrically conductive rubber is also among the possibilities. The system may have a gastight and watertight design due to manufacture from a suitable material, but may also have a fireproof, gastight and watertight design. During the manufacture of longitudinal parts 1, use will usually be made of a mold suitable for this purpose. Such a production process is known per se. Both injection molding and compression molding may be used.

Figure 6A:
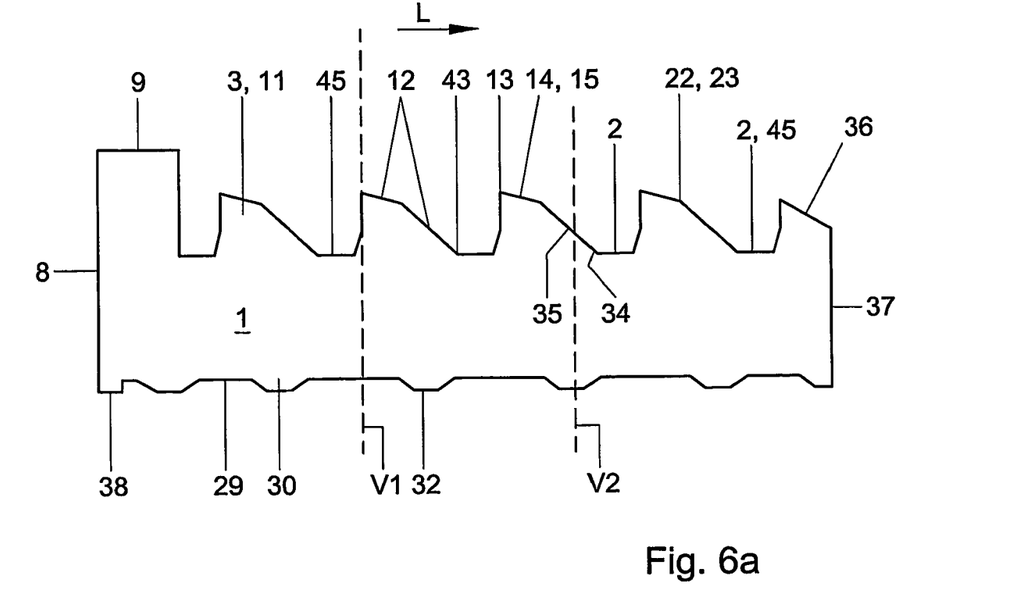
FIG. 6a shows a first example of a longitudinal part associated with an embodiment of a system according to the invention.
Figure 6B:
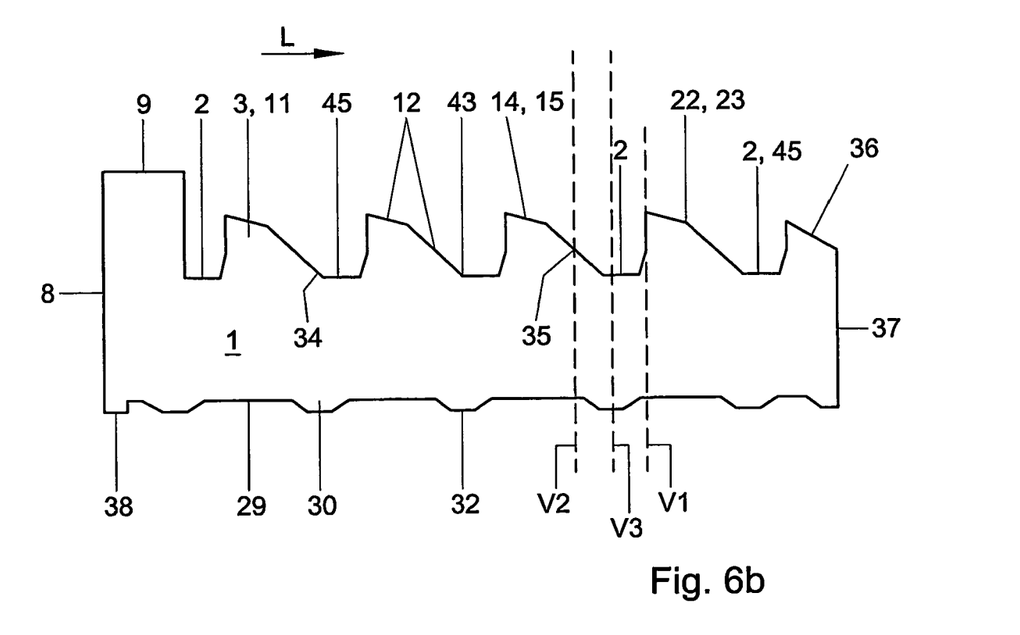
FIG. 6b shows a second example of a longitudinal part associated with an embodiment of a system according to the invention.

It is possible that each of the longitudinal parts 1 is provided with a flat-lying part 45 on the outside 2, which part extends in the longitudinal direction L from a meeting 43 of the rising surface 12 and the outside 2 up to an adjacent outer rib 3. In other words, it is possible that an annular surface extending in the longitudinal direction L is located between each of the outer ribs 3. It is likewise possible that the longitudinal parts have been designed such that a different number than two, three or four tubes are received in the tubular opening and that the space between these tubes and the inner wall of the tubular opening is sealed with the aid of a system according to the invention. FIG. 6a and FIG. 6b each show a possible cross section of an example of a longitudinal part associated with such a type of system according to the invention. FIG. 6a shows an example in which each inside 30 has overlap with one of the transverse planes of the second type V2. (A transverse plane of the second type intersects a part 35 of the rising surface 12 located near the base 34 of the sawtooth 11).

FIG. 6b shows an example in which each inner rib 30 has overlap with one of the transverse planes of a third type V3. (A transverse plane of the third type intersects a flat-lying part 45 on the outside 2, which part extends in the longitudinal direction L from the outside 2 to an adjacent outer rib 3.

In both examples, each inner rib is free from overlap with one of the transverse planes of the first type V1.

The system will be designed such that a sealing plug with at least two inner ribs and at least two outer ribs can be formed.

Figure 7:
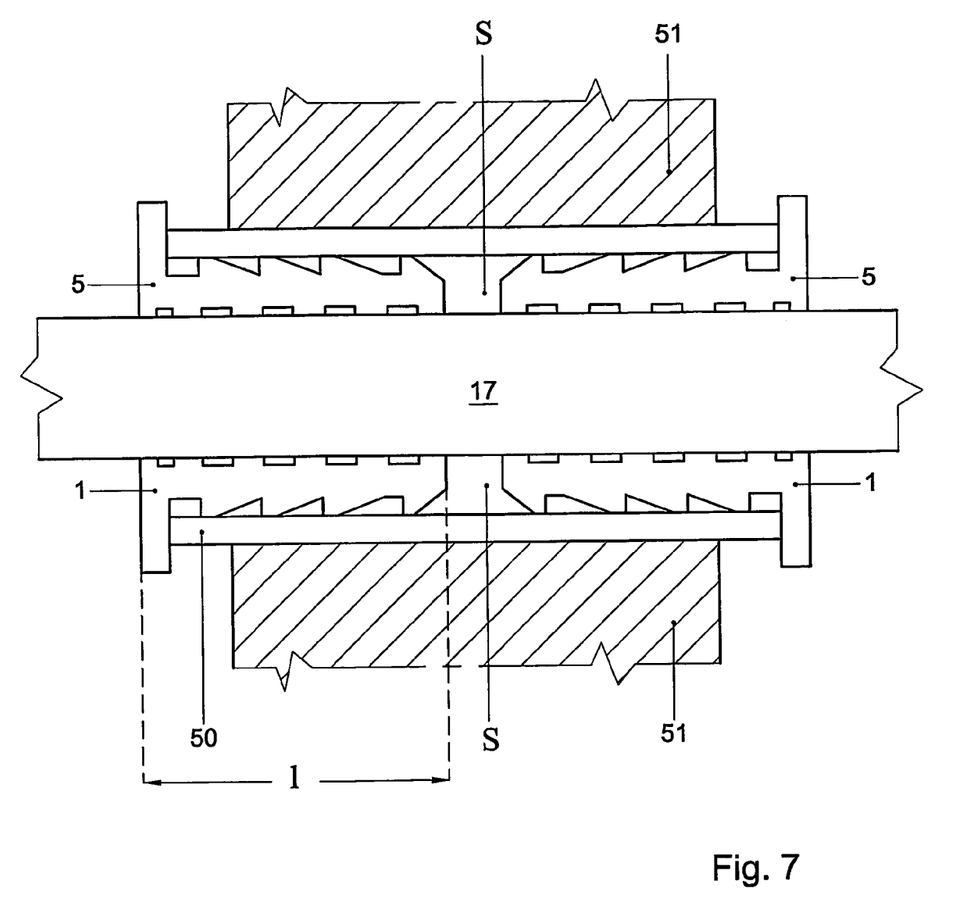
FIG. 7 shows a cross section of a possible use of two systems according to the invention.

It is further possible to seal each tubular opening of a feed-through tube 50 with, for instance, a tube 17 received therein with the aid of two systems according to the invention. FIG. 7 shows an example of such an application. It is pointed out that, due to the good resistance to pressure exerted on the sealing, it is possible to use, for instance, three instead of four outer ribs. Use of two outer ribs is also possible. This allows the feed-through tube 50 to have a relatively short design because the plugs assembled with the aid of the system according to the invention can have a relatively short design. This makes it possible to save weight, which may be useful in, particularly, shipbuilding. In addition, the feed-through tube 50 does need not form an obstacle on or to the partition or the wall 51.

It is further possible to match the length of the feed-through tube 50 and the length l of the longitudinal parts 1 to each other such that, in use, in a situation as shown in FIG. 7, the air slot S can be relatively short or narrow in the longitudinal direction L. A shortened feed-through length can be considered an advantage per se. This further offers the advantage that although, in use, during a temperature elevation, for instance as a result of fire broken out near the feed-through tube 50, the pressure in the air slot S may rise, a small outward movement of at least one of the sealing plugs 5 results in a relatively large increase of the volume of the air slot S. As a result of this volume increase, the pressure in the air slot S decreases again. In other words, due to the flexible dimensioning with regard to the length l of the longitudinal parts 1 while maintaining resistance to, particularly, the second front end 37 of the sealing plug 5, such an application is possible that the sealing plugs assembled with these longitudinal parts hold out longer than the sealing plugs formed with the known systems.

The invention is by no means limited to the exemplary embodiments shown. Many variants are possible. The outer collar may have any desired shape. The outer collar may, for instance, be designed such that the sealing plug is provided with a rectangular outer collar, for instance square with somewhat rounded angles. The thickness of the outer collar, the distance over which the outer collar extends in the longitudinal direction L, is preferably such that the shape of the sealing plug near the outer collar is preserved in use and the sealing plug cannot be pressed into the tubular opening.

Although, preferably, the sealing plug 5 has a substantially cylindrical design, a deviation from this shape is also among the possibilities. Thus, the system can be designed such that the system is suitable for tubular openings which are quadrangular and/or rectangular. Embodiments suitable for multiangular tubular openings are not precluded either. Even embodiments for other non-circular, such as for instance oval-shaped tube openings, are among the possibilities. The same holds true for the suitability with regard to cables, ducts or tubes to be fed through the tubular opening. The system can be designed such that, in use, tubes and the like with a cross section deviating from a circular shape can be enclosed by the sealing plug. If desired, a skilled person will be able to adjust the dimensions and dimensioning to the circumstances within the scope of the invention.

All such variants are understood to be within the scope of the invention.

The invention claimed is:

1. A system for sealing a space between an inner wall of a tubular opening and at least one tube or duct at least partly received in the opening, whose axis is substantially parallel to the axis of the opening, wherein the system comprises at least two segmental longitudinal parts for forming a sealing plug which can be received in the space by sliding movement of the longitudinal parts into the space, wherein the longitudinal parts are each provided with an outside provided with a number of outer ribs spaced apart in a longitudinal direction for realizing, in use, contact surfaces closed upon themselves in a circumferential direction between the sealing plug and the inner wall of the opening, and wherein, further, each of the longitudinal parts is, at a first front end, provided with an outer collar intended to be placed against an outer edge of the opening in use, and wherein, in a free state prior to being received in the space, at least one of the outer ribs substantially has the shape of a sawtooth with a rising surface rising in an outward direction away from the outside of the longitudinal part and in a direction towards the first front end, wherein a first part of the rising surface adjoining the top of the sawtooth is provided with a leveling with respect to a second part of the rising surface located farther from the top, wherein the leveling includes an angle with the longitudinal direction that is greater than zero degrees and less than an angle of the second part with the longitudinal direction, wherein a meeting of the leveling and the part of the rising surface located farther from the top forms an outwardly directed bend located in the rising surface and wherein the sawtooth is provided with a falling surface with a part located relatively far from the top and a part adjoining the top, wherein a meeting of the part located relatively far from the top and the part adjoining the top comprises an inwardly directed bend located in the falling surface, and wherein the bend located in the rising surface is located farther from the outside than the bend located in the falling surface.

2. A system according to claim 1, wherein the part of the falling surface located farther from the top is designed so as to be inclined towards the first front end.

3. A system according to claim 1, wherein the longitudinal parts are each provided with an inside which has a substantially flat design.

4. A system according to claim 1, wherein the longitudinal parts are each provided with an inside provided with a number of inner ribs spaced apart in a longitudinal direction for realizing, in use, annular contact surfaces between the sealing plug and the at least one tube or duct.

5. A system according to claim 4, wherein at least one of the inner ribs has the shape of a trapezium.

6. A system according to claim 5, wherein an abutting surface of the trapezium farthest away from the inside is smaller than any other surface of the trapezium parallel to the abutting surface.

7. A system according to claim 6, wherein angles adjoining the abutting surface are blunted or rounded.

8. A system according to claim 4, wherein each top is located in a transverse plane of a first type and that each inner rib is free from overlap with one of the transverse planes of the first type.

9. A system according to claim 4, wherein a part of the rising surface located near a base of the sawtooth is located in a transverse plane of a second type and that each inner rib has overlap with one of the transverse planes of the second type.

10. A system according to claim 4, wherein each of the longitudinal parts is provided with a first inner collar located on the inside of the first front end, which collar extends up to a same inner circumferential level as the level up to which each inner rib extends, wherein the inner circumferential level is set with respect to the centerline of the sealing plug formed in use.

11. A system according to claim 4, wherein each of the longitudinal parts is provided with a second inner collar located on the inside of the second front end, which collar extends up to a same inner circumferential level as the level up to which each inner rib extends, wherein the inner circumferential level is set with respect to the centerline of the sealing plug formed in use.

12. A system according to claim 1, wherein the at least two longitudinal parts are substantially identical.

13. A system according to claim 1, wherein each of the longitudinal parts comprises at least two inner surfaces, wherein each of these surfaces is provided with a recess extending in the longitudinal direction for being able to at least partly enclose a tube or duct.

14. A system according to claim 1, wherein each of the longitudinal parts is provided with a flat-lying part on the outside which extends in the longitudinal direction from a meeting of the rising surface and the outside up to an adjacent outer rib.

15. A wall provided with a tubular opening and at least one tube or duct at least partly received in the opening, whose axis is substantially parallel to the axis of the opening, wherein a space between an inner wall of the opening and the at least one tube or duct is sealed with the aid of a system according to claim 1.

16. A tube provided with a tubular opening and at least one tube or duct at least partly received in the opening, whose axis is substantially parallel to the axis of the opening, wherein a space between an inner wall of the opening and the at least one tube or duct is sealed with the aid of a system according to claim 1.

17. A system according to claim 1 wherein each of the longitudinal parts is provided with a run-in outer rib located near a second front end remote from the first front end, which run-in rib extends up to a first outer circumferential level located closer to a centerline H than a second outer circumferential level up to which each outer rib extends, wherein the first and the second outer circumferential level are each set with respect to the centerline of the sealing plug formed in use.

18. A system according to claim 17, wherein the longitudinal parts are each provided with an inside which has a substantially flat design.

19. A system according to claim 17, wherein the longitudinal parts are each provided with an inside provided with a number of inner ribs spaced apart in a longitudinal direction for realizing, in use, annular contact surfaces between the sealing plug and the at least one tube or duct.

20. A system according to claim 19, wherein at least one of the inner ribs has the shape of a trapezium.

21. A system according to claim 20, wherein an abutting surface of the trapezium farthest away from the inside is smaller than any other surface of the trapezium parallel to the abutting surface.

22. A system according to claim 21, wherein angles adjoining the abutting surface are blunted or rounded.

23. A system according to claim 19, wherein each top is located in a transverse plane of a first type and that each inner rib is free from overlap with one of the transverse planes of the first type.

24. A system according to claim 19, wherein a part of the rising surface located near a base of the sawtooth is located in a transverse plane of a second type and that each inner rib has overlap with one of the transverse planes of the second type.

25. A system according to claim 19, wherein each of the longitudinal parts is provided with a first inner collar located on the inside of the first front end, which collar extends up to a same inner circumferential level as the level up to which each inner rib extends, wherein the inner circumferential level is set with respect to the centerline of the sealing plug formed in use.

26. A system according to claim 19, wherein each of the longitudinal parts is provided with a second inner collar located on the inside of the second front end, which collar extends up to a same inner circumferential level as the level up to which each inner rib extends, wherein the inner circumferential level is set with respect to the centerline of the sealing plug formed in use.

27. A system according to claim 17, wherein the at least two longitudinal parts are substantially identical.

28. A system according to claim 17, wherein each of the longitudinal parts comprises at least two inner surfaces, wherein each of these surfaces is provided with a recess extending in the longitudinal direction for being able to at least partly enclose a tube or duct.

29. A system according to claim 17, wherein each of the longitudinal parts is provided with a flat-lying part on the outside which extends in the longitudinal direction from a meeting of the rising surface and the outside up to an adjacent outer rib.

30. A wall provided with a tubular opening and at least one tube or duct at least partly received in the opening, whose axis is substantially parallel to the axis of the opening, wherein a space between an inner wall of the opening and the at least one tube or duct is sealed with the aid of a system according to claim 17.

31. A tube provided with a tubular opening and at least one tube or duct at least partly received in the opening, whose axis is substantially parallel to the axis of the opening, wherein a space between an inner wall of the opening and the at least one tube or duct is sealed with the aid of a system according to claim 17.

\* \* \* \* \*